UNITED STATES PATENT OFFICE.

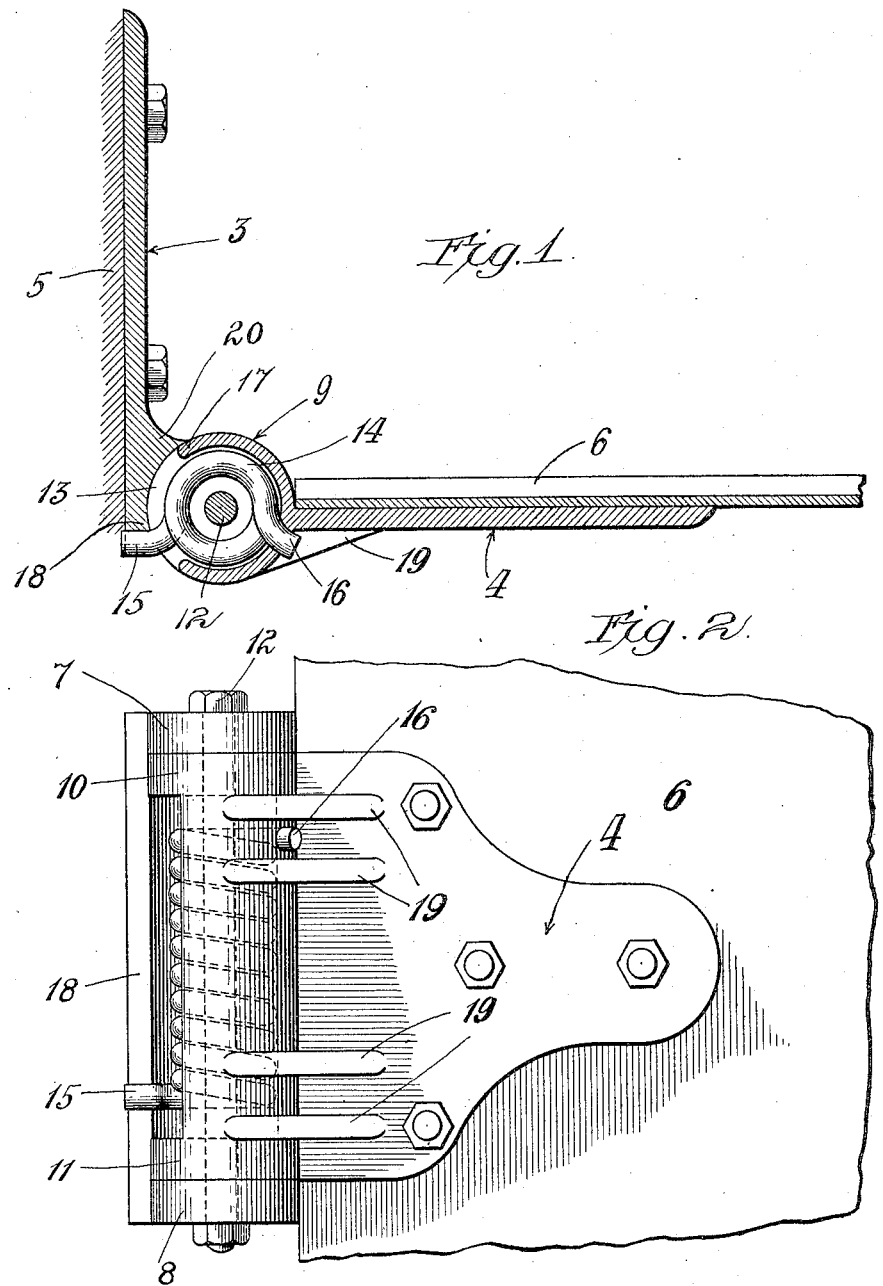

HARRY U. MORTON, OF CHICAGO, ILLINOIS, ASSIGNOR TO THE GENERAL RAILWAY SUPPLY COMPANY, OF CHICAGO, ILLINOIS, A CORPORATION OF ILLINOIS.

TRAP-DOOR HINGE.

1,057,355.  Specification of Letters Patent.  Patented Mar. 25, 1913.

Application filed February 3, 1912. Serial No. 675,336.

*To all whom it may concern:*

Be it known that I, HARRY U. MORTON, a citizen of the United States, residing at Chicago, in the county of Cook and State of Illinois, have invented certain new and useful Improvements in Trap-Door Hinges, of which the following is a specification.

This invention relates to a hinge construction specially adapted for use in connection with trap doors. The hinge is particularly adapted for use with the trap doors of interurban car vestibules. However, as will presently appear, the hinge is in no wise restricted to such use, and it will be evident that it may be used in many other locations.

In the construction of vestibule cars, it is customary to provide a trap door over the steps on each side of the vestibule, which trap door, when lowered, serves to provide an even flooring across the vestibule, and which trap door, when raised, gives access to the steps. As ordinarily constructed, these trap doors are hinged at one side to the end of the car body and have a movement through an angle of approximately 90 degrees. That is, they simply move between a horizontal and vertical position. It is desirable to have a spring connection for each such trap door, so that it can be easily raised, or the spring may even be of such strength that the trap door will rise automatically when unlatched. In any case, it is desirable to have a spring which tends to raise the trap door. On account of the comparatively small space available for the hinges of trap doors used in this class of service, it has heretofore been customary to provide a spring external to the hinge itself. This arrangement has a number of disadvantages, such as increasing the cost, and complicating the construction of the trap door; and, furthermore, on account of the comparatively small space available in which to work, the hinge of a trap door of this kind should be simply constructed, so that it can be very easily attached to the end of the car, and so that the trap door can be easily mounted.

The main objects of this invention are to provide a hinge of extremely simple construction; to provide nevertheless a hinge of maximum strength and lasting qualities; to incorporate a spring within the hinge itself which spring will tend to raise the portion of the hinge which is attached to the trap door; to almost completely inclose said spring within the hinge, thus protecting it in the best manner; and any other ways and manners to generally improve this class of device.

Other objects and uses will appear from a detailed description of the invention which consists in the features of construction and combination of parts hereinafter described and claimed.

In the drawings, Figure 1 shows a cross section of the hinge of the present invention as attached to the wall of the car and to the trap door, the trap door being in lowered position; and Fig. 2 shows a bottom view of the hinge when in the position shown in Fig. 1.

In the drawing, the hinge comprises the two members 3 and 4. One of these is secured to the end 5 of the car, and the other one to the trap door 6. One of the members, preferably the stationary member is provided with a pair of end ears 7 and 8. The other member is provided with a substantially cylindrical portion 9 which has the end walls 10 and 11 which seat loosely between the ears 7 and 8. A bolt 12 may be passed through the ears and the end walls of the cylindrical portion, thus serving as an axis about which the movable member may rotate, and serving to hold the two parts in engagement with each other. The cylindrical member 9 is open at the side 13 so that a spiral spring 14 can be slipped in sidewise. The ends 15 and 16 of this spring engage respectively the stationary member and the movable member. The spring is initially placed under such tension that it exerts a considerable force to swing the trap door upward about the axis of the bolt 12 from the position shown in Fig. 1 into a vertical position. Now, as before stated, the spring is to assist in raising the trap door. Therefore, with the trap door in the position shown in Fig. 1, the spring should be exerting its maximum force—because in such position the trap door extends in a horizontal direction. Obviously, with the trap door extending in such direction, the greatest leverage or turning effort must be exerted by the spring. However, as the trap door swings up the force necessary to raise it decreases, until finally when the trap door stands in a vertical position, the spring need exert practically no force in order to hold it in such position. I avail myself of these facts in the construction of the present hinge. As before stated, I provide the opening 13 on one side of the cylindrical portion 9. This opening I provide at a point practically diametrically opposite from the trap door, so that when the trap door stands in a vertical position, the edge 17 of the cylindrical member will clear the edge 18 of the stationary member. Thus, the opening 13 will be facing almost directly downward, and will be completely exposed to permit the spring to be inserted. In view of the fact that when the trap door stands in a vertical position, the spring need exert practically no tension, the spring can be constructed so that it will be exerting practically no force when thus inserted directly upward through the opening 13. Therefore, the construction is one which greatly facilitates the assembling of the parts, because the spring can be inserted when it is not under tension. After the spring has been set up into place, the bolt 12 can be passed through from end to end of the cylindrical member, thus joining together the two halves of the hinge, and at the same time preventing the spring from falling downward, inasmuch as the bolt passes through the central part of the spiral. In order to reinforce the member 4, the ribs 19 may be provided.

In constructing the member 3, I preferably carry the upper edge 20 over far enough so that the edge 17 of the cylindrical member will never clear the same. In this way, I obviate all danger of objects being jammed in between these edges, inasmuch as this would lock the trap door down, and inasmuch as persons might become injured by being caught at this point. Furthermore, by thus carrying the edge 20 over far enough, a much better appearance is presented to an observer standing on the trap door or in the vestibule.

I do not limit myself to the particular construction herein shown and described, except as stated in the claim, but include within the scope of my invention all equivalent constructions and devices.

I claim:

In a hinge, the combination of a pair of members, one having an arm for attachment to a stationary object, and the other having an arm for attachment to a movable object, a pivotal connection between both of said members, the last mentioned member having a barrel extending in a direction parallel to the axis of the pivot, there being a slot extending in the direction of the axis of the pivot in that side of the barrel substantially opposite to the direction of the arm of that member, a co-acting portion on the other member having a surface for co-action with the barrel and lying in a direction substantially parallel to the direction of the arm of said member, and a spring lying within the barrel and having one end in engagement with each member and tending to rotate the members to bring their arms together, whereby when the arms of the two members stand at right angles to each other the slot of the barrel is partially closed by the co-acting surface of the other member to thereby retain the spring in place, and whereby when the arms of the two members are brought together the slot of the barrel is fully opened and the tension is released from the spring to permit the spring to be withdrawn through the open slot of the barrel, substantially as described.

HARRY U. MORTON.

Witnesses:
 THOS. A. BANNING, Jr.,
 WALTER HOELTJE.

---

Copies of this patent may be obtained for five cents each, by addressing the "Commissioner of Patents, Washington, D. C."